(12) United States Patent
Tian

(10) Patent No.: US 10,081,436 B1
(45) Date of Patent: Sep. 25, 2018

(54) HYBRID VTOL FIXED-WING DRONE

(71) Applicant: Yu Tian, Hong Kong (HK)

(72) Inventor: Yu Tian, Hong Kong (HK)

(73) Assignee: AUTOFLIGHTX INTERNATIONAL LIMITED, Causeway Bay (HK)

( * ) Notice: Subject to any disclaimer, the term of this patent is extended or adjusted under 35 U.S.C. 154(b) by 0 days.

(21) Appl. No.: 15/643,452

(22) Filed: Jul. 6, 2017

(51) Int. Cl.
*B64C 39/12* (2006.01)
*B64D 31/00* (2006.01)
*B64C 39/02* (2006.01)

(52) U.S. Cl.
CPC ............ *B64D 31/00* (2013.01); *B64C 39/024* (2013.01); *B64C 39/12* (2013.01); *B64C 2201/021* (2013.01); *B64C 2201/104* (2013.01); *B64C 2201/165* (2013.01)

(58) Field of Classification Search
CPC ......... B64C 39/04; B64C 39/08; B64C 39/12; B64C 11/46; B64C 27/24; B64C 2201/165; B64D 31/00
See application file for complete search history.

(56) References Cited

U.S. PATENT DOCUMENTS

| 9,120,560 | B1 * | 9/2015 | Armer ................. B64C 29/0008 |
| 2004/0195433 | A1 * | 10/2004 | Kayama | |
| 2006/0151666 | A1 * | 7/2006 | VerdayMay | |
| 2006/0266879 | A1 * | 11/2006 | Svoboda, Jr. ........... B64C 27/08 244/7 A |
| 2014/0158815 | A1 * | 6/2014 | Renteria | |
| 2014/0312177 | A1 * | 10/2014 | Gaonjur ................. B64C 27/24 244/7 A |
| 2016/0236774 | A1 * | 8/2016 | Niedzballa | |

* cited by examiner

*Primary Examiner* — Jessica B Wong
(74) *Attorney, Agent, or Firm* — WPAT, P.C., Intellectual Property Attorneys; Anthony King

(57) ABSTRACT

A long-distance drone is disclosed having a canard body style with a main body, a left main wing, a right main wing, a left forewing, and a right forewing. The left forewing is attached to the main body forward of the left main wing, and the right forewing is attached to the main body forward of the right main wing. There is a left linear support connecting the left forewing to the left main wing, and a right linear support connecting the right forewing to the right main wing. A plurality of propellers are disposed on the left and the right linear supports.

6 Claims, 9 Drawing Sheets

HYBRID VTOL FIXED-WING DRONE

FIELD OF THE DISCLOSURE

The field of the disclosure is aircrafts in general and hybrid VTOL fixed-wing drones specifically.

BACKGROUND OF THE DISCLOSURE

Drones, whether manned or unmanned, have been proposed to conduct various missions and functions. Their missions and functions, however, are often limited by the traveling range and endurance of the drone. There is a continuing need for a drone that is sufficiently efficient to travel longer distances.

There is also a continuing need for new ways of creating redundancy in a drone so that when one propeller fails, the drone may still function and continue to stay in the air.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The embodiment may seek to satisfy one or more of the above-mentioned desires. Although the present embodiment may obviate one or more of the above-mentioned desires, it should be understood that some aspects of the embodiment might not necessarily obviate them.

BRIEF SUMMARY OF THE DISCLOSURE

In one aspect of the disclosed long-distance drone, it can have a canard body style with a main body, a left main wing, a right main wing, a left forewing, and a right forewing. The left forewing can be attached to the main body forward of the left main wing, and the right forewing can be attached to the main body forward of the right main wing.

There can be a left linear support spaced apart from said main body connecting the left forewing to the left main wing.

There can also be a right linear support spaced apart from said main body connecting the right forewing to the right main wing.

In one aspect, there can be a first and a second propeller coupled to the left linear support. In another aspect, there can be a third and a fourth propeller coupled to the right linear support.

In further embodiments, there can be a fifth propeller coupled to the left linear support, and a sixth propeller coupled to the right linear support.

In yet another embodiment, the first propeller, the second propeller, and the third propeller can be linearly arranged to parallel the longitudinal axis of the main body, and the fourth propeller, the fifth propeller, and the sixth propeller can be linearly arranged to parallel the longitudinal axis of the main body.

The first propeller, the second propeller, and the third propeller can be directly disposed on the left linear support, and the fourth propeller, the fifth propeller, and the sixth propeller can be directly disposed on the right linear support.

Contemplated drone can optionally have a push propeller disposed at a back end of the main body.

In another embodiment, instead of a push propeller, there can be a seventh propeller coupled to the main body and the seventh propeller has a plane of motion that is perpendicular to a plane of motion of the first propeller.

Contemplated drone can further include a left vertical stabilizer disposed on a back end of the left linear support, and a right vertical stabilizer disposed on a back end of the right linear support.

In some embodiments, the first propeller and the third propeller can be disposed on a bottom side of the left linear support, while the second propeller can be disposed on a top side of the left linear support.

Likewise, the fourth propeller and the sixth propeller can be disposed on a bottom side of the right linear support, while the fifth propeller can be disposed on a top side of the right linear support.

In other embodiments, the first propeller and the second propeller are disposed on opposing sides of the left linear support, and the fourth propeller and the sixth propeller are disposed on opposing sides of the left linear support.

Further contemplated is for the first propeller to have a first range motion with a first radius, and for the second propeller to have a second range of motion with a second radius. In some embodiments, the distance between the center of the first range of motion and the center of the second range of motion can be less than twice the first radius.

In yet other embodiments, wherein from a top view, a range of motion of the first propeller visually overlaps with a range of motion of the second propeller.

In yet another embodiment, the first radius can be substantially the same as the second radius.

Other embodiments of the disclosure include a fixed-wing drone having a left main wing and a right main wing; a left linear alignment of propellers having a first propeller, a second propeller, and a third propeller; a right linear alignment of propellers having a fourth propeller, a fifth propeller, and a sixth propeller. In some embodiments, the left linear alignment is parallel to the right linear alignment.

Contemplated first propeller, second propeller, and the third propeller can be directly disposed linearly in a straight line on the left linear support, and the straight line can be parallel to a longitudinal axis of the main body.

There is also contemplated a method of improving stability, and/or durability, and or redundancy in a hybrid fixed-wing VTOL drone. In one embodiment, the method can include connecting a left main wing to a left canard forewing with a left linear support. Also, the method can include connecting a right main wing to a right canard forewing with a right linear support.

In some embodiments, the left and right linear supports can counteract against a twisting force applied to the main body of the drone during flight.

Contemplated method can include a step of arranging a spatial relationship between a center of gravity of the drone and said at least three propellers disposed on each of the left and right linear support, such that when any one of said propellers malfunctions, the drone may remain functioning by simply shutting down one other said propellers.

Various objects, features, aspects and advantages of the present embodiment will become more apparent from the following detailed description of embodiments of the embodiment, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

Figure 1:
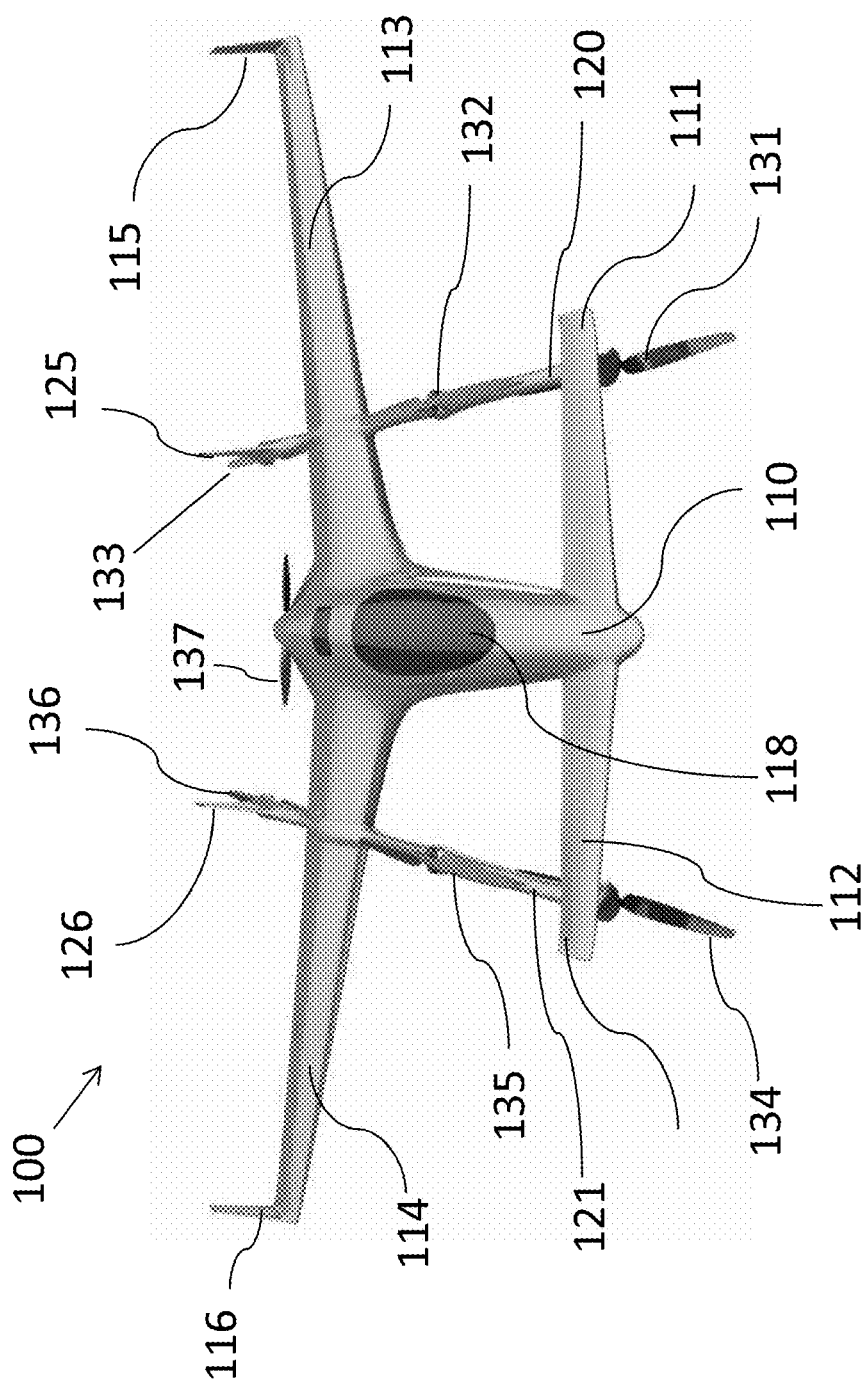
FIG. 1 is a top front perspective view of an embodiment of the contemplated drone utilizing a canard design having two parallel linear supports to connect the forewings with the main wings.
Figure 2:
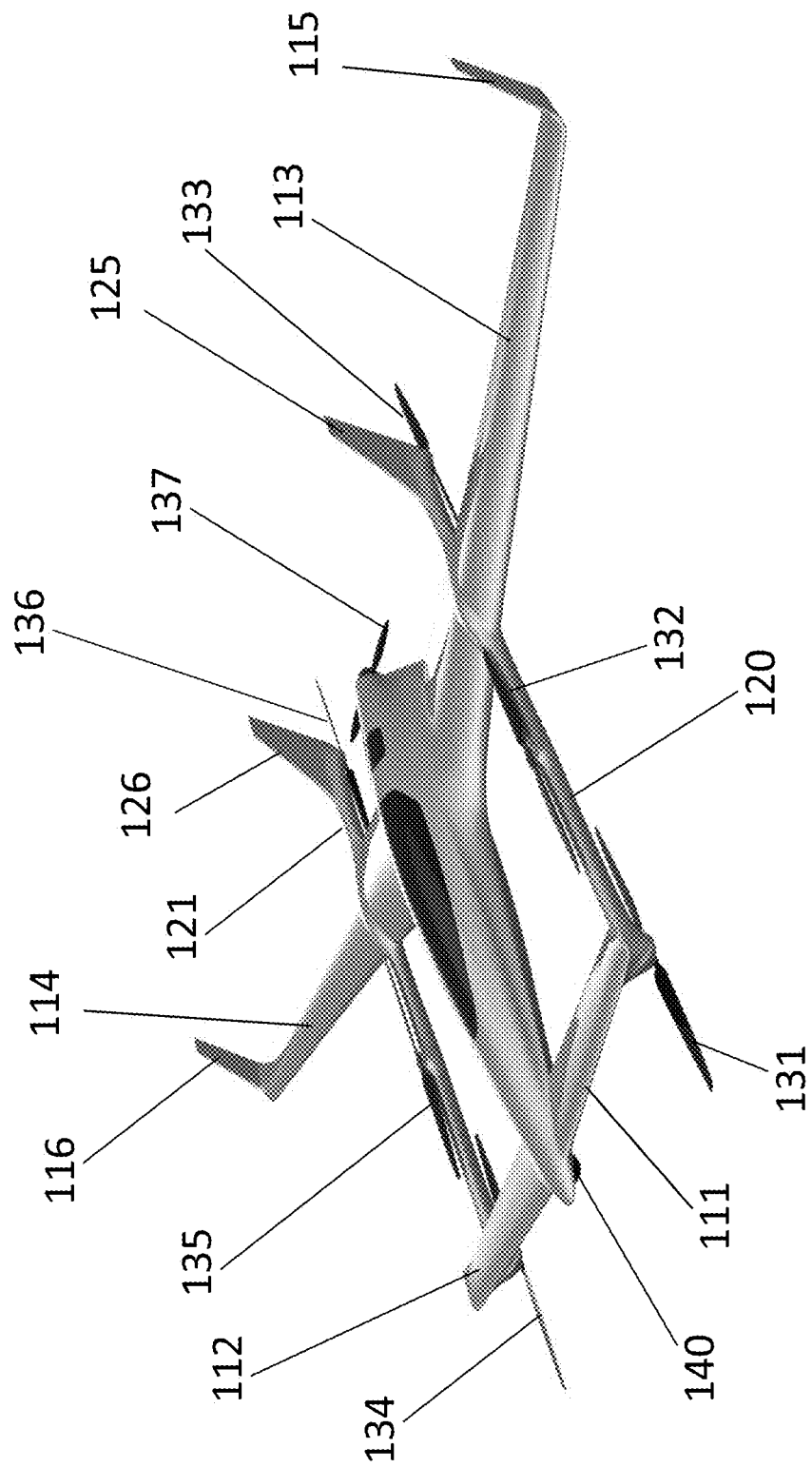
FIG. 2 is a top perspective view of an embodiment of the contemplated drone.

The drone and its various aspects can now be better understood by turning to the following detailed description of the embodiments, which are presented as illustrated examples of the embodiment defined in the claims. It is expressly understood that the embodiment as defined by the claims may be broader than the illustrated embodiments described below.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

The words used in this specification to describe the embodiment and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

As used herein, the terms "failure" and "malfunction" in conjunction with a propeller refer to a condition where the propeller cease to function properly as intended by its manufacturer due to reasons outside of its control. For example, a propeller may fail or malfunction when it is damaged by an outside force. Propellers in a drone are known to be damaged when it collides with a bird, a tree, or a building. A propeller may also fail or malfunction when its mechanical or electrical a material component experience a break down. Also, a propeller may fail or malfunction when its power supply or fuel supply ceases to supply energy to the propeller when such supply of energy is expected.

As used herein, the term "center of gravity" in conjunction with the drone refers to a center of gravity in consideration of the total weight of the drone including all of its components, fuel (if any), and its payload. For example, if the drone is contemplate to carry cargo or human, the weight of the cargo and/or human would be part of the calculation in designing where the center of gravity should be.

As used herein, the term "range of motion" in conjunction with the propeller refers to a circular area having a radius equal to the length of the propeller's blade. Since the blade of the propeller is designed to rotate either in a clockwise or counter-clockwise along a plane, the range of motion can also be described as a circular area along a plane.

As used herein, the term "overlap" in conjunction with the range of motions of propellers refers to a visual appearance that two circular areas have certain portions touching each other, but does not mean physical touching. That is, when two ranges of motions "overlap," they do not mean physically overlapping each other. When two ranges of motions "overlap," they merely appear to be in each other's space when looking from a particular angle. This overlaps may or may not necessarily create interference in fluid dynamics and aerodynamics of the two adjacent propellers.

As used herein, the term "hybrid" in conjunction with fixed-wing VTOL drone design refers to the classification of aircraft type, and does not refer to its power train. In the disclosure here, the term "hybrid" refers to the fact that the contemplated drone is a fixed-wing aircraft and at the same time has propellers so that the drone can vertically take-off and land (VTOL). In terms of power train, the contemplated embodiments can use entirely electric power train, a fuel-powered power train, a combination of both, or any other known or yet to be known power train technology.

As used herein, the term "drone" refers to any manned or unmanned aircraft, of various sizes. For example, contemplated drones as disclosed herein can have a wingspan of less than 0.5 meter, and can have a cabin space sufficiently large to seat passenger(s). The term "drone" as used herein can or cannot be limited to unmanned aerial vehicles (UAV).

As used herein, the term "vertical" in conjunction with a stabilizer refers to any angle. In one embodiment, it is at a 90 degree angle, perpendicular to the horizontal plane of the main wings. In other embodiments, it can be at a tilted angle.

The inventor has discovered a novel hybrid VTOL fixed-wing drone design that can drastically improve at least one of the following characteristics in a drone: efficiency, durability, travel distance, and redundancy.

Referring now to FIG. 1, FIG. 1 generally depicts the basic structure of a hybrid VTOL Fixed-wing drone 100 in accordance with one aspect of the disclosure.

Drone 100 is contemplated to have a main body 110, two forewings 111, 112 attached to the front end of the main body 110. There are two main wings 113, 114 attached to the main body towards the rear of the main body 110. This is a typical canard design where two smaller forewings are placed forward to two larger main wings.

Main body 110 can have an aerodynamic design and may optionally have a cabin sufficiently large to seat human passenger(s) or cargo. In the exemplar drone 100 as shown in the drawing figures, what appears to be a windshield 118 may or may not be an actual functional windshield 118, depending on whether the particular embodiment has a passenger cabin.

There can be two main wings 113 and 114 attached to the rear portion of the main body 110. In some embodiments, terminal ends of each of the main wings 113 and 114 may have a vertical stabilizer 115, 116.

Forewings 111 and 112 can be attached to the front end of the main body 110. Forewings 111, 112 are shorter than the main wings 113, 114.

There can be a left and a right linear supports 120, 121, each of which physically connects a forewing 111, 112 to the main wings 113, 114. In one aspect of the contemplated embodiment, the linear supports 120, 121 are fixed near the terminal ends of each perspective forewings 111, 112. In one embodiment, the linear supports 120, 121 can be fixedly attached a location on the forewings 111, 112 that is distal to the middle point between the tip of the forewings 111, 112 and the main body 110. In yet another embodiment, the linear supports 120, 121 can be fixedly attached to anywhere along the length of the forewings 111, 112. Although the exemplar linear supports 120, 121 shown in FIG. 1 are attached to the undersides of the forewings 111, 112, other embodiments may have the linear supports 120, 121 attached to the upper side of the forewings 111, 112.

The contemplated linear supports 120, 121 can be made of suitable materials to withstand the physical demands of flying, and can resist contortion. Such materials include natural and synthetic polymers, various metals and metal alloys, naturally occurring materials, textile fibers, glass and ceramic materials, and all reasonable combinations thereof.

The straight linear supports 120, 121 can provide structural integrity to the drone 100 by minimizing a contortion force applied to the main body 110 by the up and down movement of the main wings 113, 114 and the forewings 111, 112 during flight.

The linear supports 120, 121 can have a straight body and can be parallel to the longitudinal axis of the main body 110. As shown in the frontal view of FIG. 6, the straight body configuration allows minimum aerodynamic obstruction during flight. The linear supports 120, 121 can have a thickness that is no thicker than the thickest part of the main wings 113, 114. The linear supports 120, 121 can have a cross-sectional shape that is circular, oval, square, rectangular, or any other suitable shape.

In other contemplated embodiments (not shown), the linear supports 120, 121 can have a curvature or other angles besides being straight.

The left and right linear supports 120, 121 can have a suitable length to connect forewings 111, 112 to the main wings 113, 114. In the embodiment as shown in FIG. 3, the left and right linear supports 120, 121 are attached to the underside of the forewings 111, 112

In the exemplar drone 100 shown in the drawing figures, the left and the right linear supports 120, 121 each can have a vertical stabilizer 125, 126 disposed on the top of its rear terminal end. In one embodiment, the vertical stabilizers 125, 126 are at a 90 degree angle, perpendicular to the horizontal plane of the main wings. In other embodiments, these vertical stabilizers 125, 126 can be at a tilted angle.

It should be understood that the above-described angles are exemplary and any other angles can be adopted in various embodiments of this disclosure.

Figure 3:
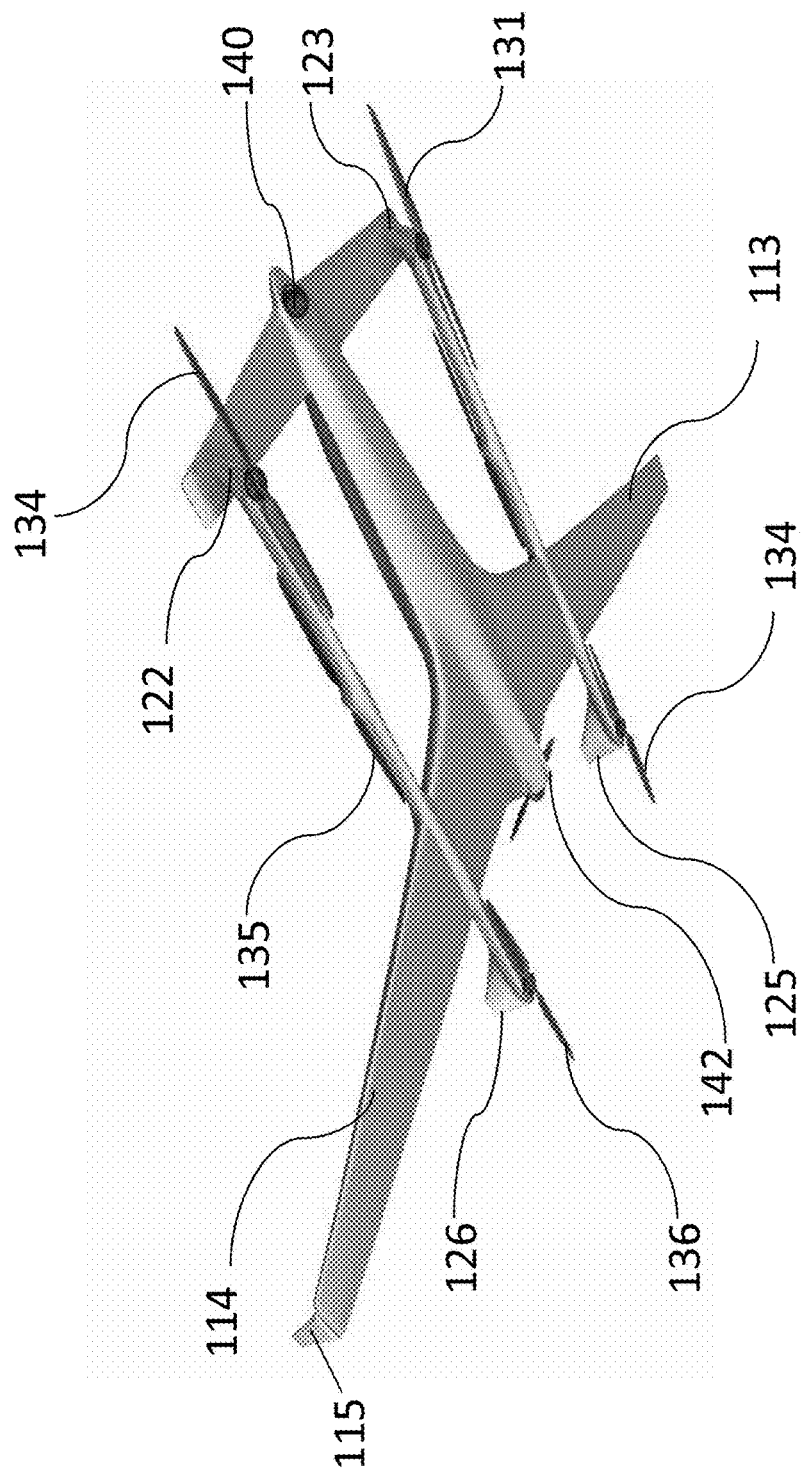
FIG. 3 is a bottom perspective view of an embodiment of the contemplated drone.

Referring now to FIG. 3, there can optionally be rotors and propellers disposed on each of the linear supports 120 and 121 to provide vertical take-off and landing capabilities to the drone 100. Various numbers of propellers are contemplated. In the embodiments shown in the figures, each linear support 120, 121 has three propellers. Left linear support 120 can have a propeller 131 disposed at the front terminal end of the linear support 120, on the underside of the left forewing 111, facing downwards. Left linear support 120 can have another propeller 132 disposed on top of the linear support 120 at a location in between the forewing 111 and the main wing 113, facing upwards. Left linear support 120 can have yet another propeller 133 disposed at the bottom of the linear support 120 near a rear terminal end, facing downwards.

Similarly on the right side of the drone 100, right linear support 121 can have a propeller 134 disposed at the front terminal end of the right linear support 121, on the underside of the right forewing 112, facing downwards. Right linear support 121 can have another propeller 135 disposed on top of the right linear support 121 at a location in between the forewing 112 and the main wing 114, facing upwards. Right linear support 121 can have yet another propeller 136 disposed at the bottom of the right linear support 121 near a rear terminal end, facing downwards.

Each of the propellers 131, 132, 133, 134, 135, 136 shown in the drawing figures has two blades. In some embodiments, propellers 131, 132, 133, 134, 135, 136 can lock into a longitudinal position (as shown in FIGS. 1-4) during high speed flying when these propellers 131, 132, 133, 134, 135, 136 are not necessary to keep the drone 100 in air. By locking these propellers into a longitudinal position parallel to the direction of the flight, aerodynamic is improved, as opposed to not locking them or keeping them spinning.

As those of ordinary skill in the art will recognize, the propellers 131, 132, 133, 134, 135, 136 may readily be modified as dictated by the aesthetic or functional needs of particular applications. For example, each of all or some of the propellers 131, 132, 133, 134, 135, 136 can have 2-blades, 3-blades, 4-blades, or any other known types of blades.

As to the rotors that drive the propellers 131, 132, 133, 134, 135, 136, to maintain an aerodynamic profile, rotors should have as low a profile as possible. It is important to appreciate that although the present embodiment is particularly well suited for use by implementing a low-profile rotor, it should be understood that other types of rotor or combinations of different types of rotors can be used to perform that same function as the low-profile rotors.

Figure 6:
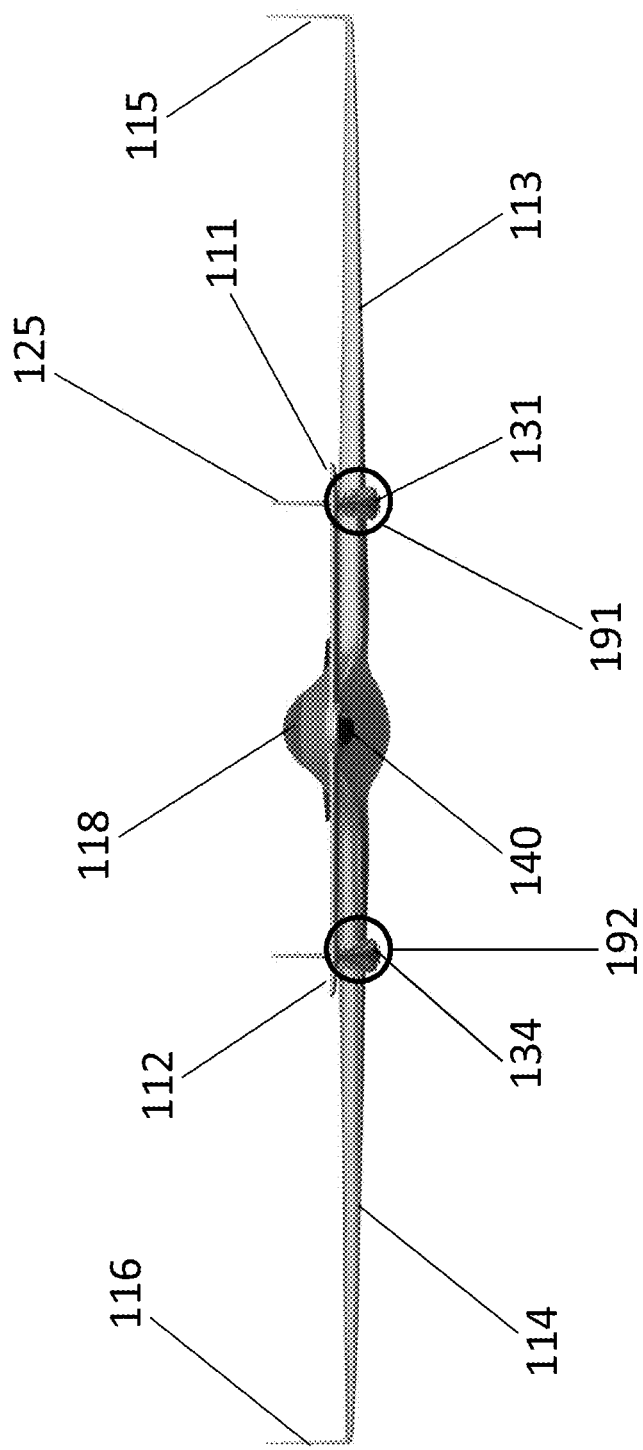
FIG. 6 is a direct frontal view of one embodiment of the contemplated drone.

As shown in FIG. 6, the contemplated rotors can be disposed within the linear supports 120, 121 and do not bulge out or extend beyond the aerodynamic contour of the linear supports 120, 121. Even the propellers 131, 132, 133, 134, 135, 136 can have a low-profile and can be disposed closely to the linear supports 120, 121 so that when the propellers 131, 132, 133, 134, 135, 136 are locked in a longitudinal position (as shown in FIG. 6) during high speed flying, an improved aerodynamic profile is present.

In one embodiment, the lowest portion of the propellers 131, 132, 133, 134, 135, 136 do not extend beyond the lowest part of the main body 110. In another embodiment, the highest portion of the propellers 131, 132, 133, 134, 135, 136 do not extend beyond the highest part of the main body 110. As shown in FIG. 6, form a frontal view, the distance between the highest points of the propellers 131, 132, 133, 134, 135, 136 to the lowest point of the propellers 131, 132, 133, 134, 135, 136 is substantially equal to the thickest part of the main wings 113, 114.

In yet another contemplated embodiment, a novel feature includes arranging multiple rotors/propellers in only two parallel columns such that from a frontal view, these multiple rotor/propellers create only two points 191, 192 of air disturbance (see FIG. 6). This is important because this design drastically improve the aerodynamic profile of a multicopter drone, or a VTOL drone.

Figure 7:
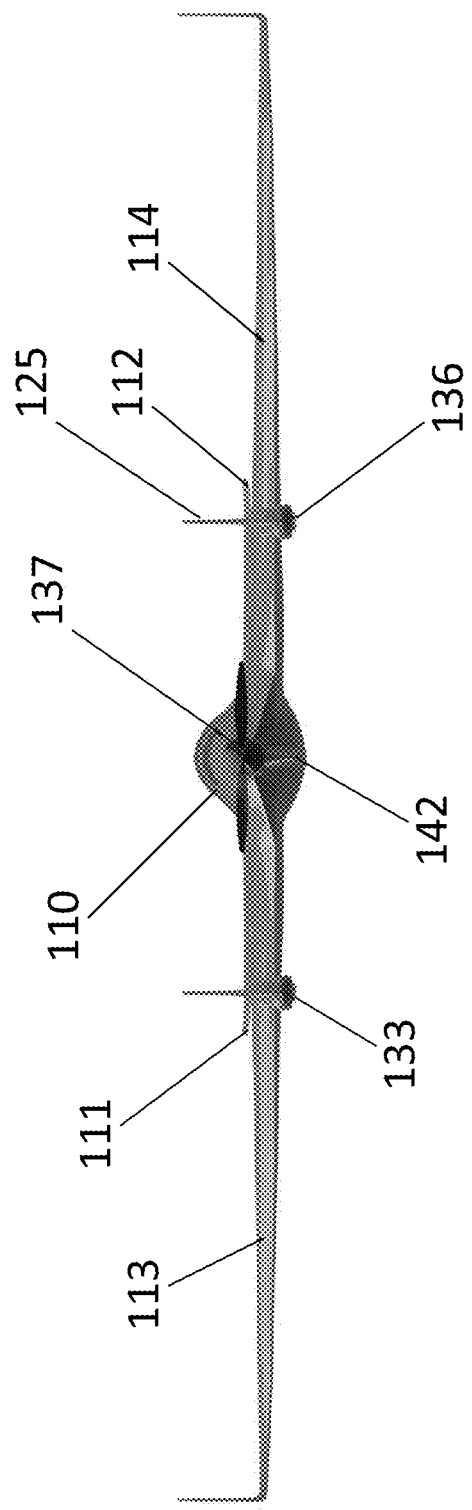
FIG. 7 is direct rear view of one embodiment of the contemplated drone.
Figure 8:
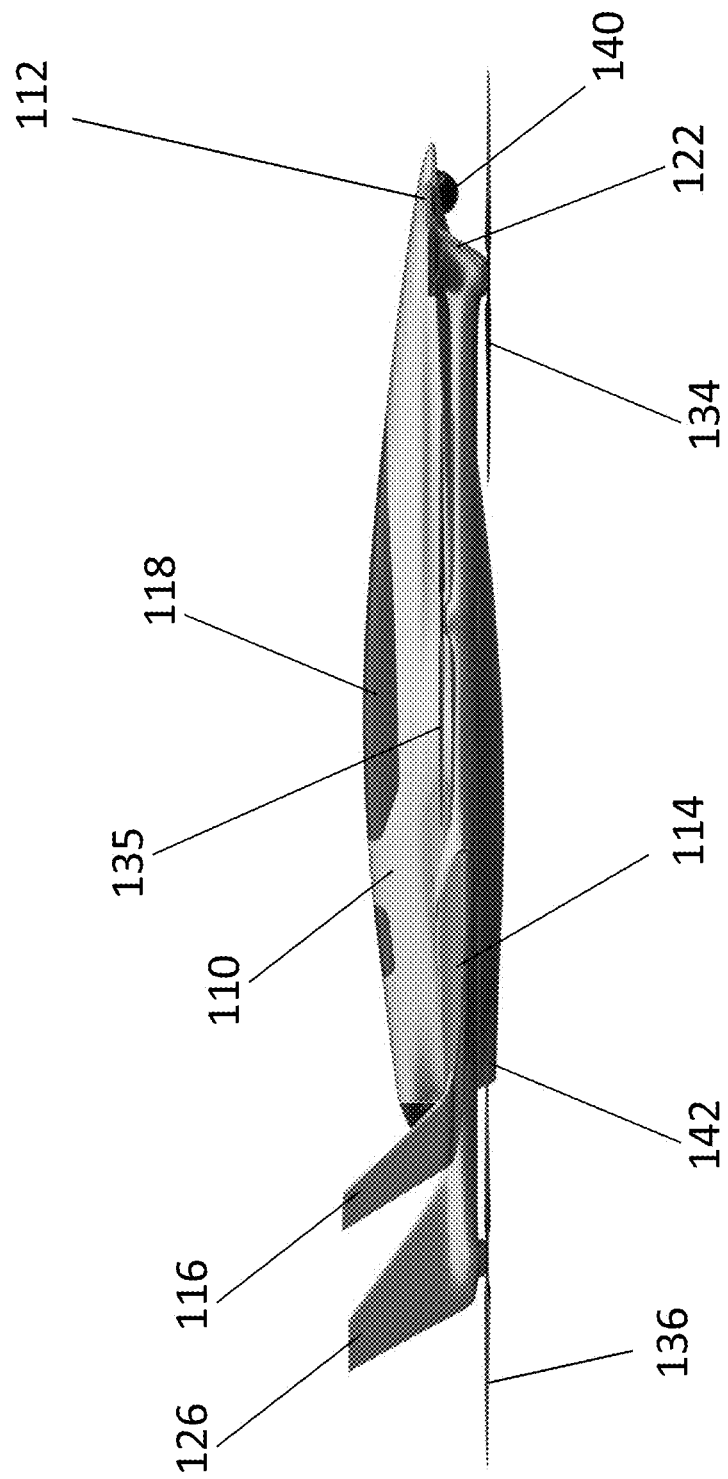
FIG. 8 is a right side view of one embodiment of the contemplated drone.

FIG. 8 illustrates one embodiment of how the six propellers 131, 132, 133, 134, 135, 136 can be arranged. In this embodiment, the six propellers 131, 132, 133, 134, 135, 136 are arranged in two columns parallel to each other. Each column can be parallel to the longitudinal axis of the main body 110. Known multi-copter drones arrange their propellers in an evenly spaced array to encircle around the center of gravity, because evenly spaced array in a circle provides the best stability and redundancy. When one propeller in such prior art multi-copter drone fails, the prior art multi-copter simply turns off another propeller on the opposite end of the circular array so the rest of the working propellers are balanced to keep the drone in the air. In the embodiment shown in FIGS. 1-5, the six propellers 131, 132, 133, 134, 135, 136 are not evenly spaced apart from an adjacent propeller. By having the six propellers 131, 132, 133, 134, 135, 136 arranged in two parallel columns, drag is minimized because the frontal profiles of all six propellers 131, 132, 133, 134, 135, 136 would only equal to the frontal profile of about two such propellers (see FIGS. 6 and 7).

It should be particularly appreciated that although the drawing figures only show six propellers 131, 132, 133, 134, 135, 136, any even numbers of propellers can be arranged in two parallel columns. In one embodiment, the drone 100 can have two parallel columns of propellers, each column having two propellers. In another embodiment, the drone 100 can have two parallel columns of propellers, each column having four propellers. In yet another embodiment, the drone 100 can have two parallel columns of propellers, each column having five propellers.

This plurality of propellers 131, 132, 133, 134, 135, 136 may be disposed on various locations along the length of the linear supports 120, 121.

Figure 4:
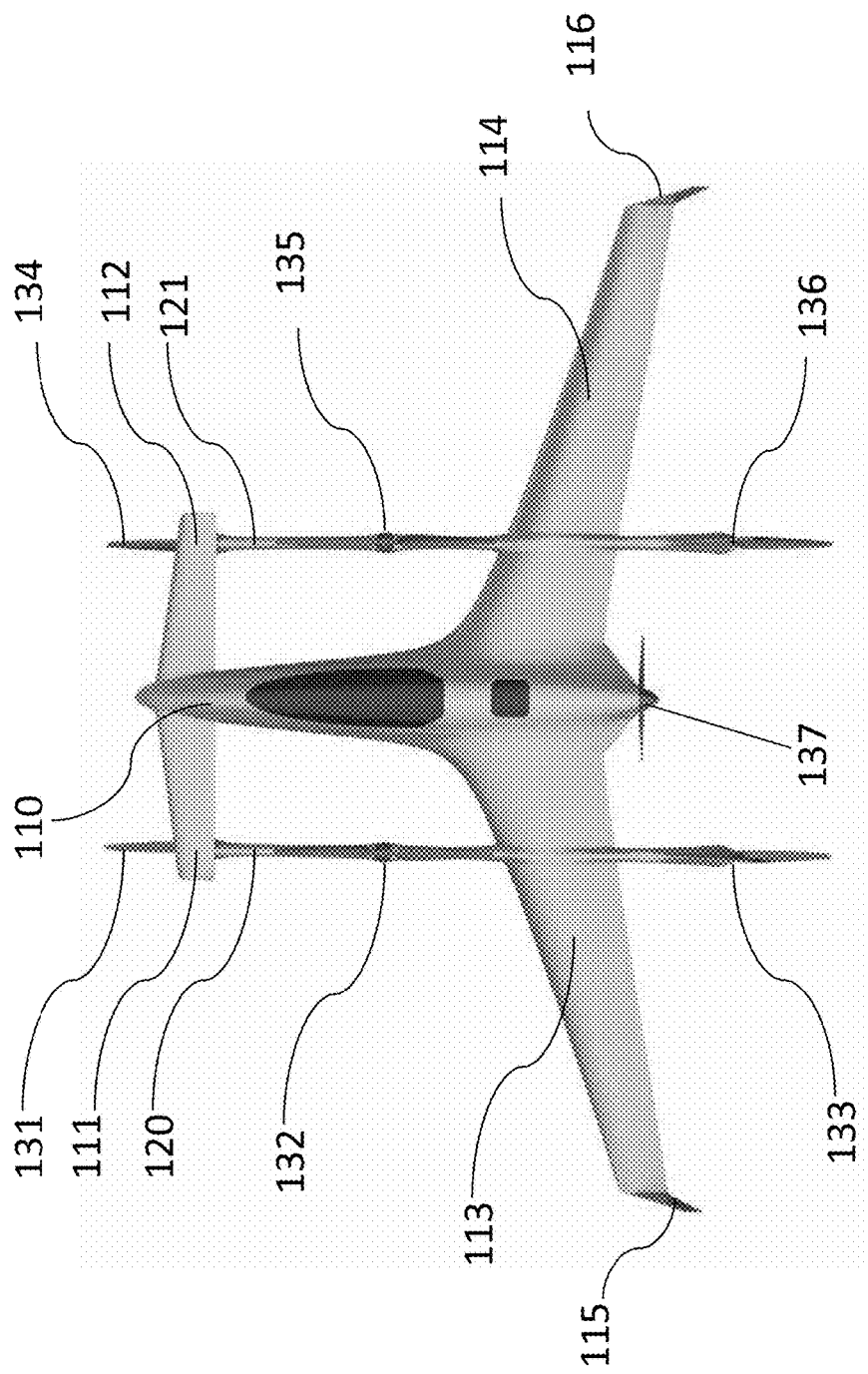
FIG. 4 is a top view of one embodiment of the contemplated drone.
Figure 5:
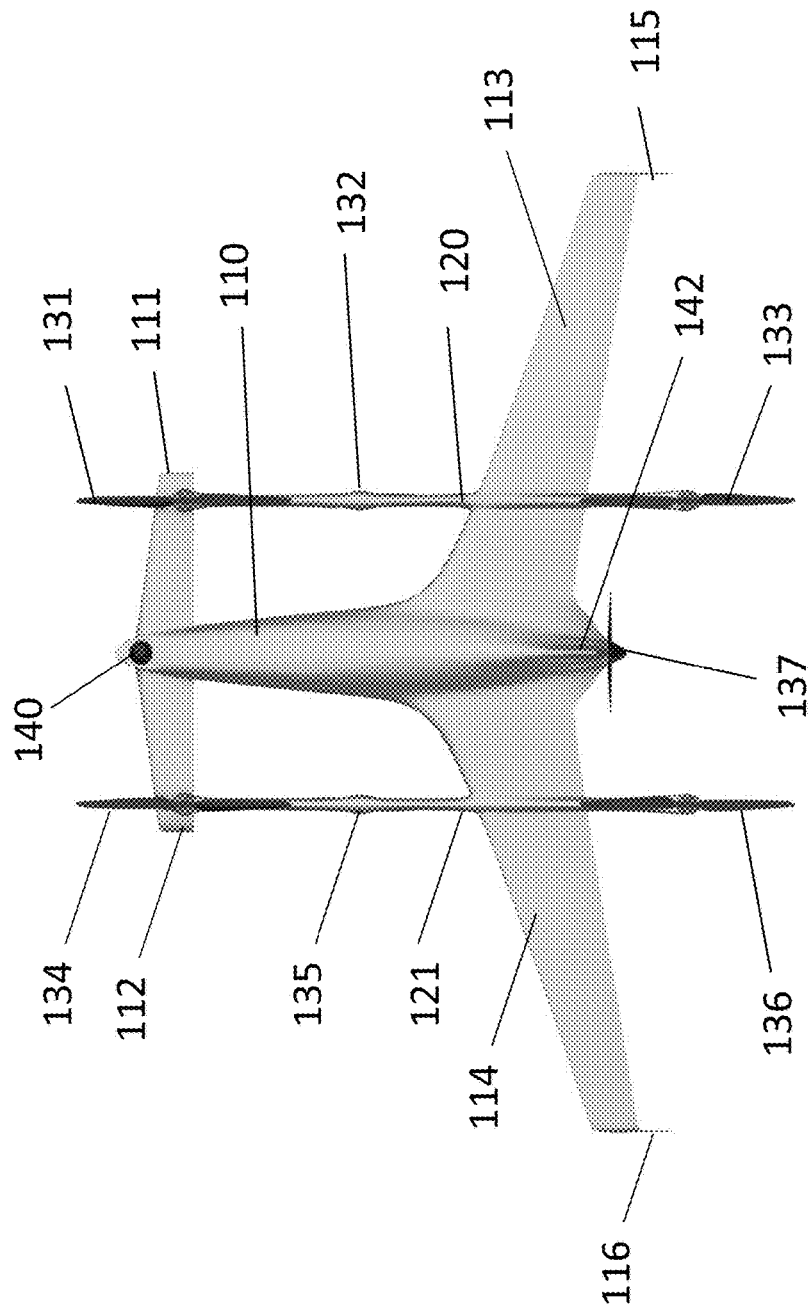
FIG. 5 is a bottom view of one embodiment of the contemplated drone.
Figure 9:
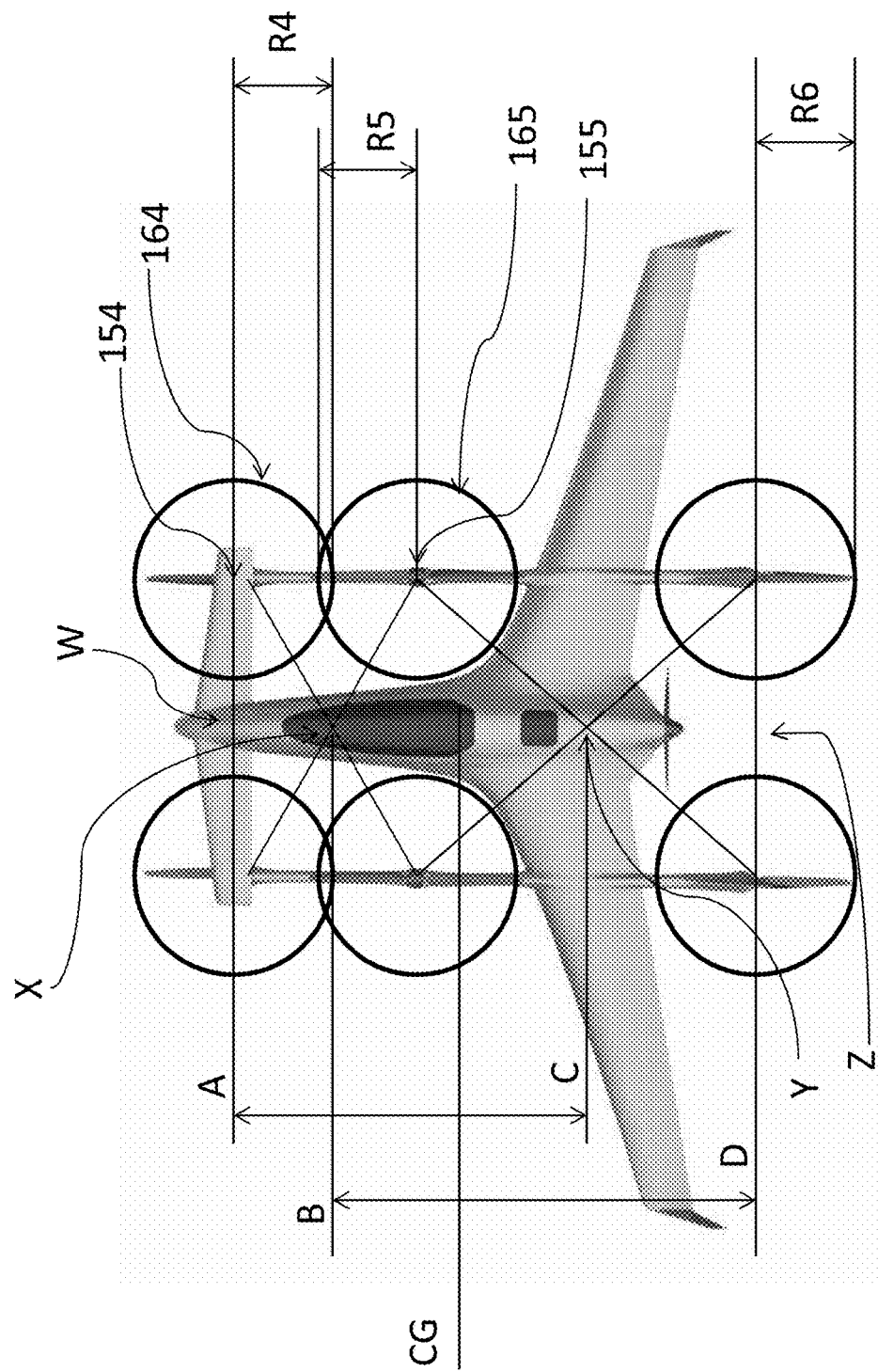
FIG. 9 is a top view of another aspect of the contemplated drone, illustrating spatial relationships of the propellers to each other, and explains the center of gravity of the drone.

In one embodiment as shown in FIGS. 4 and 5, linear supports 120, 121 each has a rear terminal end that extends rearward beyond the rear edge of the main wings 113, 114. By extending its rear terminal end beyond the rear edge of the main wings 113, 114, the linear supports 120, 121 in the exemplar embodiment can have propellers 133, 136 disposed on the their terminal end without having the main wings 113, 114 in the way of airflow during vertical takeoff and landing. As shown in FIG. 9, the two circles surrounding propellers 133, 136 represent the range of motion for their respective blades. Both circles do not overlap with the main wings 113, 114.

In the embodiments shown in the drawing figures, contemplated linear supports 120, 121 do not extend forward beyond the frontal edge of the forewings 111, 112. The embodiment shown in FIG. 3 has both linear supports 120, 121 terminate right underneath the forewings 111, 112. The terminal ends of the linear supports 120, 121 can each form a vertical ledge 122, 123.

In another embodiment (not shown), contemplated linear supports 120, 121 may each extend beyond the frontal edge of the forewings 111, 112. In that way, the two front-most propellers 131, 134 can operate without being interfered by the forewings 111, 112 being in the way of airflow.

In the embodiment shown in FIG. 9, high efficiency can be achieved by keeping the main body 110 and the linear supports 120, 121 reasonably short, thereby keeping the total weight of the drone relatively low. Instead of using smaller propellers 131, 132, 134, 135 in the first two rows of propeller arrangement so these two rows of propellers do not interfere with each other by overlapping their range motion, this embodiment can have the first rows' range of motion 164 overlap the second row's range of motion 165. In the embodiment of FIG. 9, each propeller in the first row can have a radius R4. Each propeller in the second row can have a radius R5. Each propeller in the last row can have a radius R6.

Although the propellers with different length of blades (thereby a different range of motion radius) can be utilized, the embodiment in FIG. 9 has all six propellers 131, 132, 133, 134, 135, 136 having the same radius. In this embodiment, the distance between the center rotating axle 154 of propeller 134 to the center rotating axle 155 of propeller 135 is less than twice the radius R4.

From a top view, the ranges of motions 164, 165 appear to overlap each other partially. Their respective propeller blade, however, do not physically make contact with each other because these two propellers 134, 135 are disposed on opposite sides of the same linear support 121. All six propellers 131, 132, 133, 134, 135, 136 blow air in a downward fashion.

In one aspect of the disclosure, the contemplated drone 100 can have a push propeller 137 disposed on the rear end of the main body 110. The push propeller 137 has a spinning axle that is perpendicular to the spinning axles of propellers 131, 132, 133, 134, 135, 136. During high speed flight, the push propellers 137 is instrumental moving the drone 100, whereas all six propellers 131, 132, 133, 134, 135, 136 are locked and not rotating as described above.

Drone 100 can be equipped with other accessories, such as a camera 140 to conduct aerial surveillance and other date collection. Camera 140 can be disposed at any other position on the drone 100.

Contemplated drone 100 can optionally have one or more air diffusers disposed on the underside of the drone. As shown in FIG. 3, one air diffuser 142 can be disposed on the rear bottom end of the main body 110. The diffuser 142 can be a shaped section of the main body's underbody. In other embodiments, the air diffuser 142 may act as a deturbulator.

One aspect of the instant disclosure includes a contemplated method to arrange a spatial relationship between a center of gravity of a drone and at least three propellers disposed on each of the left and right side of the drone, whether or not these propellers are disposed on the linear supports. In some embodiments, these propellers are arranged in pairs, each pair being equal-distant to each other forming two parallel arrays. The intended objective is to keep the drone 100 reasonably light weight, to keep the drone aerodynamically enhanced, to have sufficient power to vertically takeoff without resorting to the biggest and strongest rotors, and to have a build-in redundancy such that when any one of the six or more propellers malfunctions, the drone may remain functioning by simply shutting down one other said propellers.

For example, when propeller 131 fails, the drone can turn off propeller 136 to still keep the drone balanced; when propeller 132 fails, the drone can turn off propeller 135 to still keep the drone balanced; when propeller 133 fails, the drone can turn off propeller 134 to still keep the drone balanced; and vise versa.

As illustrated in FIG. 6, the spatial arrangement of the propellers 131, 132, 133, 134, 135, 136 between each other and to the center of gravity of the drone can be done by the following method. In one example, consider that each of the six propellers 131, 132, 133, 134, 135, 136 have the same output of 1 kg. Propellers 131 and 134 would have a center of lift force (2 kg) at point W (line A), which is a point equal-distant to the center of propeller 131 and propeller 134. Propellers 131, 132, 134 and 135 would have a center of lift force (4 kg) at point X (line B), which is a point equal-distant to the center of propellers 131, 132, 134 and 135. Propellers 132, 133, 135 and 136 would have a center of lift force (4 kg) at point Y (line C), which is a point equal-distant to the center of propellers 132, 133, 135 and 136. Propellers 133 and 136 would have a center of lift force (2 kg) at point Z (line D), which is a point equal-distant to the center of propellers 133 and 136. The contemplated center of gravity for the entire drone 100 can be line CG which is two third the distance from line A to line C, which is also one third the distance from line B to line D.

Another aspect of the instant disclosure is a method of making hybrid VTOL fixed-wing drones lighter while providing it with sufficient structure and powertrain needs to maintain long-distance flying and/or high speed flying. Longer main body would mean heavier body that causes the flight time to decrease unless larger powertrain and power source is provided, which in turn also cause the drone to be heavier and less aerodynamic.

In yet another aspect of the disclosure, a novel way of arranging multiple propellers in a hybrid VTOL fixed-wing drone includes that propellers to not stack on top of another propeller. In the illustrated embodiments, six propellers 131, 132, 133, 134, 135, 136 are horizontally spaced part from each other, and there can be no stacking of propellers.

In one contemplated method, the first row of propellers are caused to overlap in their range of motion with the second row of propellers when looking from a top view. In another contemplated method, the first row of propellers 131, 134 are disposed near or at the bottom side of the canard forewings 111, 112.

Contemplated fixed-wing drones having the disclosed features or designed by the disclosed methods can expect to have a continuous flight time of at least eight hours when using an electric powertrain, and 24-hours when using a hybrid (fuel-electric) powertrain.

The above disclosed embodiments can be made of all known suitable natural or synthetic materials or a mixture of materials. Additionally, it should be appreciated that the materials contemplated herein may be derivatized in numerous manners.

Although all of the above inventive features discussed are discussed in conjunction with a canard body style in an aircraft, all of the features discussed are also contemplated to be implemented on any other fixed-wing aircraft body styles. These features specifically includes, but are not limited to: arrangement of multiple rotors/propellers in only two parallel columns; arrangement of multiple rotors/propellers that occupy only two points of disturbance from a frontal view; having two parallel linear supports to physically connect wings in the front to wings in the back; overlapping propellers' ranges of motion to decrease the length of the main body of the aircraft; disposing adjacent propellers on opposite sides of the drone (e.g., one disposed on top, the other disposed on the bottom of the drone); utilizing low-profile rotors that are no thicker than the thickest part of a main wing; utilizing low-profile propeller blades that does not extend substantially beyond the highest part of the main wing; and utilizing low-profile propeller blades that does not extend substantially beyond the lowest part of the main wing.

Another way of describing this novel method of improving an aerodynamic profile of a drone is to entirely enclose low-profile rotors for each of the at least three propellers disposed on each linear support 120, 121. In this way, the linear array of these three propellers can have a combined frontal projection that substantially equals to a cross sectional area of each linear support 120, 121.

Additionally, although flaps, ailerons, rudders, and elevators are not specifically discussed in this disclosure, each of them can be used in any of the disclosed embodiments.

Thus, specific embodiments and applications of a hybrid VTOL Fixed-Wing Drone have been disclosed. It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiment. In addition, where the specification and claims refer to at least one of something selected from the group consisting of A, B, C . . . and N, the text should be interpreted as requiring only one element from the group, not A plus N, or B plus N, etc.

What is claimed is:

1. A long-distance drone comprising:
   a canard body style having a main body, a left main wing, a right main wing, a left forewing, and a right forewing;
   wherein the left forewing is attached to the main body forward of the left main wing;
   wherein the right forewing is attached to the main body forward of the right main wing;
   a left linear support spaced apart from said main body connecting the left forewing to the left main wing;
   a right linear support spaced apart from said main body connecting the right forewing to the right main wing;
   a first propeller, a second propeller, and a third propeller linearly arranged and disposed on the left linear support;

a fourth propeller, a fifth propeller, and a sixth propeller linearly arranged and disposed on the right linear support;

wherein the first and the third propellers are disposed on a first side of the left linear support, and the second propeller is disposed on a second side of the left linear support opposite to the first side of the left linear support;

wherein one of said first and second side of the left linear support is a bottom side positioned below a horizontal position of both the left forewing and left main wing;

wherein the fourth and the sixth propellers are disposed on a first side of the right linear support, and the fifth propeller is disposed on a second side of the right linear support opposite to the first side of the right linear support;

wherein one of said first and second side of the right linear support is a bottom side positioned below a horizontal position of both the right forewing and right main wing;

wherein the first and the second propellers only partially overlap in their respective ranges of motion;

wherein each of said left and right linear support extends rearward beyond the left and right main wings, where the left and right main wings are also a pair of rearmost wings;

wherein each of said left and right main wings is longer than each of said left and right forewings; and wherein each of the first, second, third, fourth, fifth, and sixth propeller has a thrust vector, and these thrust vectors are perpendicular to a longitudinal axis of the main body.

2. The drone as recited in claim 1, wherein the first propeller, the second propeller, and the third propeller are linearly arranged to parallel the longitudinal axis of the main body; and wherein the fourth propeller, the fifth propeller, and the sixth propeller are linearly arranged to parallel the longitudinal axis of the main body.

3. The drone as recited in claim 2, wherein the first propeller, the second propeller, and the third propeller are directly disposed on the left linear support, and wherein the fourth propeller, the fifth propeller, and the sixth propeller are directly disposed on the right linear support.

4. The drone as recited in claim 2 further comprising a push propeller disposed at a back end of the main body.

5. The drone as recited in claim 1 further comprising a left vertical stabilizer disposed on a back end of the left linear support, and a right vertical stabilizer disposed on a back end of the right linear support.

6. The drone as recited in claim 1, wherein the first side of the left linear support is the bottom side of the left linear support, and the second side is a top side of the left linear support.

* * * * *